US008903531B2

(12) United States Patent
Pharand et al.

(10) Patent No.: US 8,903,531 B2
(45) Date of Patent: Dec. 2, 2014

(54) CHARACTERIZING LAMINATE SHAPE

(75) Inventors: Sylvain Pharand, Bromont (CA); Rejean Paul Levesque, Bromont (CA); Isabelle Paquin, Bromont (CA); Denis Plouffe, Bromont (CA); Matthieu Lirette-Gelinas, Bromont (CA)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 13/227,582

(22) Filed: Sep. 8, 2011

(65) Prior Publication Data

US 2012/0065758 A1 Mar. 15, 2012

(30) Foreign Application Priority Data

Sep. 9, 2010 (CA) ...................................... 2713422

(51) Int. Cl.
*G06F 17/00* (2006.01)
*B07C 5/342* (2006.01)

(52) U.S. Cl.
CPC ...................................... *B07C 5/342* (2013.01)
USPC ................ 700/99; 700/219; 700/95; 700/117

(58) Field of Classification Search
None
See application file for complete search history.

(56) References Cited

U.S. PATENT DOCUMENTS

| | | | | |
|---|---|---|---|---|
| 5,568,391 | A * | 10/1996 | Mckee | 700/122 |
| 5,773,315 | A * | 6/1998 | Jarvis | 438/14 |
| 6,013,541 | A * | 1/2000 | Tan et al. | 438/106 |
| 6,232,974 | B1 * | 5/2001 | Horvitz et al. | 345/419 |
| 6,589,801 | B1 * | 7/2003 | Yoon et al. | 438/15 |
| 6,883,158 | B1 * | 4/2005 | Sandstrom et al. | 430/5 |
| 7,369,970 | B2 * | 5/2008 | Shimizu et al. | 703/1 |
| 7,482,180 | B1 | 1/2009 | Sylvestre et al. | |
| 8,001,516 | B2 * | 8/2011 | Smith et al. | 716/136 |
| 8,027,859 | B2 * | 9/2011 | Pulfer | 705/7.22 |
| 2002/0177916 | A1 * | 11/2002 | Poolla et al. | 700/108 |
| 2005/0106803 | A1 * | 5/2005 | Yamada et al. | 438/200 |
| 2007/0118300 | A1 * | 5/2007 | Mollenkopf et al. | 702/33 |
| 2008/0058978 | A1 * | 3/2008 | Cain et al. | 700/121 |

(Continued)

FOREIGN PATENT DOCUMENTS

| | | | |
|---|---|---|---|
| EP | 0763417 | A1 | 3/1997 |
| JP | 9-76352 | A | 3/1997 |
| JP | 2002-134375 | A | 5/2002 |
| JP | 04-060066 | B2 | 3/2008 |

OTHER PUBLICATIONS

Zewi, G., et al., "Residual Stresses and Warpage in Woven-Glass/Epoxy Laminates", Mar. 1987, p. 44.

(Continued)

*Primary Examiner* — Ryan Jarrett
*Assistant Examiner* — Michael J. Scapin
(74) *Attorney, Agent, or Firm* — Steven Meyers; L. Jeffrey Kelly

(57) ABSTRACT

A method of sorting laminates includes characterizing first shapes of laminates from measurements taken of each, assembling the laminates to derive a first relationship between the first shapes and yield loss, characterizing second shapes of the laminates from a reduced number of the measurements to derive a second relationship between the second shapes and yield loss, analyzing a change in the derived relationships to determine a least number of the measurements necessary for achieving the yield loss and sorting supplied laminates in accordance with a characterized shape of each, which is obtained from the least number of the measurements taken for each supplied laminate.

14 Claims, 6 Drawing Sheets

(56) References Cited

U.S. PATENT DOCUMENTS

| | | | | |
|---|---|---|---|---|
| 2008/0077362 | A1* | 3/2008 | Willis et al. | 702/189 |
| 2008/0286885 | A1* | 11/2008 | Izikson et al. | 438/7 |
| 2009/0313588 | A1* | 12/2009 | Dang et al. | 716/2 |
| 2010/0197051 | A1* | 8/2010 | Schlezinger et al. | 438/16 |
| 2010/0198565 | A1* | 8/2010 | Jayaram et al. | 703/1 |
| 2012/0245861 | A1* | 9/2012 | Greene | 702/40 |
| 2012/0309187 | A1* | 12/2012 | Sri-Jayantha et al. | 438/613 |

OTHER PUBLICATIONS

Thomas, Joe, et al., "Industry Trends Driving Need for Warpage/Flatness Specifications", US Tech Magazine, Sep. 2006.

Hassell, Patrick, "Thinking Globally, Measuring Locally", PCB Warpage, Printed Circuit Fabrication 1978-1998, pp. 30-36.

* cited by examiner

CHARACTERIZING LAMINATE SHAPE

CROSS REFERENCE TO RELATED APPLICATION

The present application claims the benefit of priority to a Canadian Patent Application Serial Number 2713422 entitled "CHARACTERIZING LAMINATE SHAPE", filed Sep. 9, 2010 with the Canadian Intellectual Property Office, the content of which is incorporated herein by reference in its entirety.

BACKGROUND

Aspects of the present invention are directed to a method to characterize a laminate shape and to optimize chip packaging yield.

In chip manufacturing processes, chips are often formed of laminates that are layered upon one another and then bonded to form a package. For these processes to be optimized, the laminates selected for use should have shapes, warpage and/or coplanarity that conform to required predefined shapes, warpage and/or coplanarity since laminates that do not meet the requirements will not reliably fit together. In the case of laminates formed of organic materials (i.e., organic laminates) the predefined shape, warpage and/or coplanarity requirements are particularly important since organic laminates can relatively easily deform due to, for example, temperature dependent warpage during various stages.

Indeed, laminate warpage and, particularly, organic laminate warpage is known to impact assembly yield and performance in chip manufacturing processes and, therefore, efforts have been undertaken to address the issue. Typically, this is accomplished by the organic laminates being selected for use in chip manufacturing processes according to whether they meet a predetermined warpage specification value or, rather, a total laminate warpage value, which are absolute values that describe an amount of warpage exhibited by a particular laminate. A laminate that meets the warpage specification value or exhibits less warpage than the warpage specification value is selected for use and those that do not are discarded.

Unfortunately, the warpage specification value does not contain information about shape characteristics. Thus, it is possible that a laminate will satisfy the warpage specification value but have a shape that is still not suitable for an optimal laminate. That is, laminate selection using the warpage specification value or the total laminate warpage value only impacts the laminate yield and does not necessarily provide optimal laminates for assembly performance. On high end products, however, it is highly desirable to provide laminates with optimal characteristics to achieve highest first pass yield.

SUMMARY

In accordance with an aspect of the invention, a method of sorting laminates is provided and includes characterizing first shapes of laminates from measurements taken of each, assembling the laminates to derive a first relationship between the first shapes and yield loss, characterizing second shapes of the laminates from a reduced number of the measurements to derive a second relationship between the second shapes and yield loss, analyzing a change in the derived relationships to determine a least number of the measurements necessary for achieving the yield loss and sorting supplied laminates in accordance with a characterized shape of each, which is obtained from the least number of the measurements taken for each supplied laminate.

In accordance with an aspect of the invention, a system to sort laminates is provided and includes an inspection apparatus to inspect laminates and to generate data in accordance with results of the inspection, a networking unit coupled to the inspection apparatus and a computing device, coupled to the networking unit, to receive the data generated by the inspection apparatus by way of the networking unit, the computing device including a processing unit and a non-transitory computer readable medium on which executable instructions are stored, which, when executed, cause the processing unit to characterize first shapes of the laminates from measurements taken of each, assemble the laminates to derive a first relationship between the first shapes and yield loss, characterize second shapes of the laminates from a reduced number of the measurements to derive a second relationship between the second shapes and yield loss, analyze a change in the derived relationships to determine a least number of the measurements necessary for achieving the yield loss and sort supplied laminates in accordance with a characterized shape of each, which is obtained from the least number of the measurements taken for each supplied laminate.

In accordance with an aspect of the invention, a method of laminate sorting is provided and includes measuring, at an inspection apparatus, each laminate of a sample of laminates at predefined surface positions thereof to determine a shape of each laminate, assembling the sampled laminates and tracking a response variable, performing dimensional reduction for feature extraction, inputting data reflective of the feature extraction into a statistical model, adjusting parameters to the response variable and checking for model accuracy and once the model accuracy is validated by repetitive confirmations, inputting the statistical model into the inspection apparatus for laminate sorting.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

With reference to FIGS. 1-5, an alternative to the usual coplanarity/warpage specification formulation is provided since the usual "one value" target specification does not guarantee an expected yield especially for multi-chip modules. For example, a warpage specification is not sufficient to characterize shape variations that could be detrimental to performance. In accordance with aspects of the present invention, however, a characterization of a laminate shape is integrated into warpage calculations through a linear combination of localized readings at specific points on examined laminates. This linear combination is derived from an application of a generalized linear model to a sufficient sample of experimental data.

A final form of the specification may be A1*X1+A2*X2+ . . . +AN*XN<C, where A1 . . . AN are scalar weights derived from methods described below, X1 . . . XN are, for example, averaged height measurements at certain locations on the laminate and C is a threshold derived from cost/yield considerations.

Figure 1:
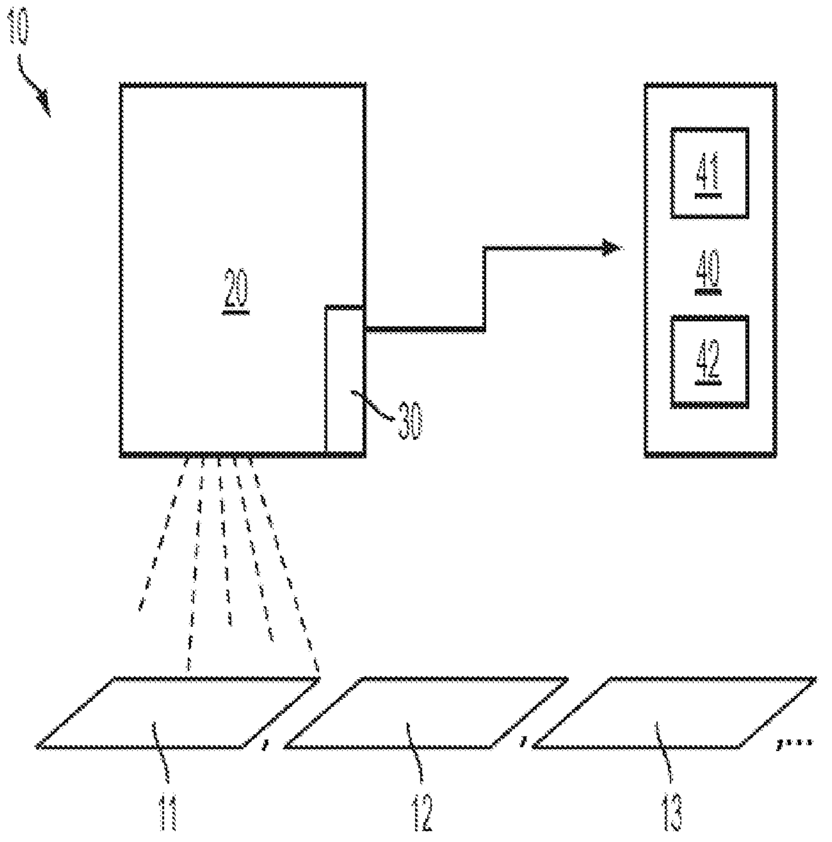
FIG. 1 is a schematic diagram of a system to characterize a laminate shape.

With reference to FIG. 1, a system 10 is provided to characterize shapes of pluralities of laminates 11, 12, 13, . . . , such as organic laminates for use in wafer processing. The system 10 includes an inspection apparatus 20, such as an optical device that is well known in the field, to take measurements of the laminates at various positions and to generate laminate shape data in accordance with results of the measurement. The system 10 further includes a networking unit 30 coupled to and disposed in signal communication with the inspection apparatus 20 and a computing device 40.

The computing device 40 includes a processing unit 41 and a non-transitory computer readable medium 42. The computing device 40 is coupled to and disposed in signal communication with the networking unit 30 to thereby receive the laminate shape data generated by the inspection apparatus 20. The non-transitory computer readable medium 42 has executable instructions stored thereon, which, when executed, cause the processing unit 41 to characterize first shapes of the laminates 11, 12, 13, . . . from measurements taken of each, assemble the laminates 11, 12, 13, . . . to derive a first relationship between the first shapes and yield loss, characterize second shapes of the laminates 11, 12, 13, . . . from a reduced number of the measurements to derive a second relationship between the second shapes and yield loss, analyze a change in the derived relationships to determine a least number of the measurements necessary for achieving the yield loss, and sort supplied laminates in accordance with a characterized shape of each, which is obtained from the least number of the measurements taken for each supplied laminate. These operations will be described further below and will relate to laminate 11 as being representative of each of the laminates 11, 12, 13, . . . .

Figure 2:
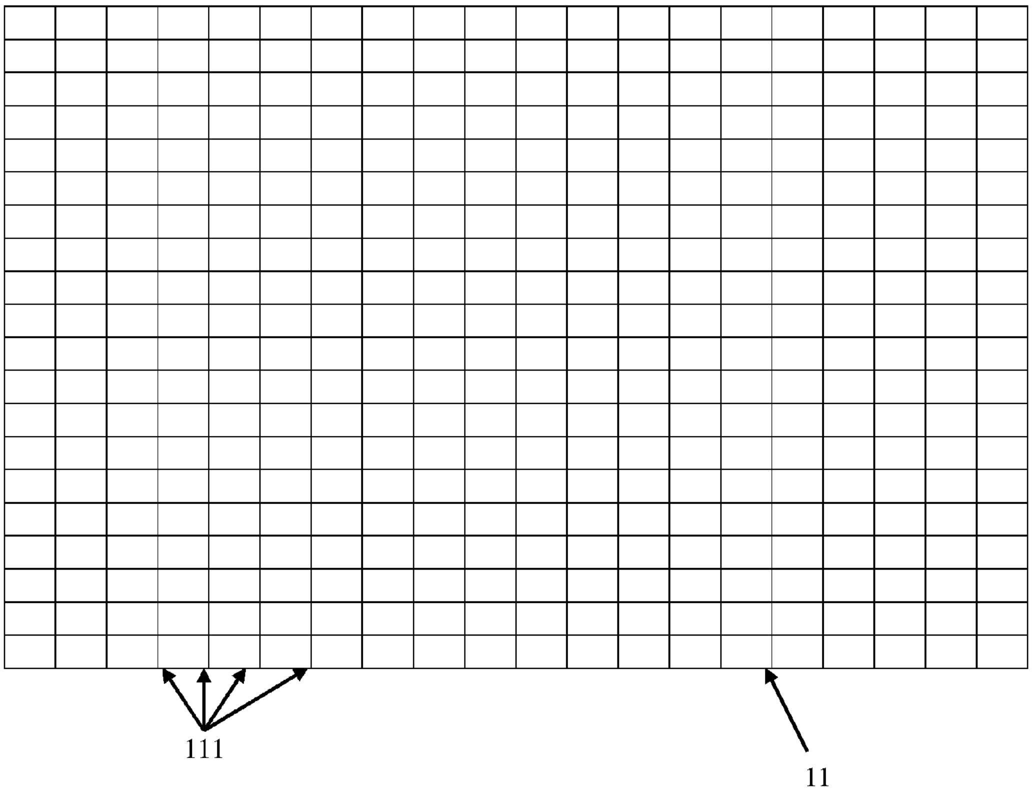
FIG. 2 is a 20×20 grid defined on a laminate surface of a laminate.

With reference to FIG. 2, the characterizing of the first shape of the laminate 11 from measurements taken of laminate 11 is achieved by taking the measurements along a traceable pattern that is mapped onto a surface thereof. Since the laminate 11 is a substantially flat planar member, the traceable pattern may include grid points 111 arranged in a matrix extending over the surface. These measurements may include, for example, laminate height measurements taken by optical measurement techniques at the grid points 111, laminate thickness measurements taken at the grid points 111 and/or similar types of measurements. Where a number of the measurements is relatively large compared to a surface area of the laminate 11 surface, such that each grid point 111 describes a relatively small area of the laminate 11, the shape of the laminate 11 can be directly obtained from the set of measurements taken at each grid point 111.

Figure 3A:
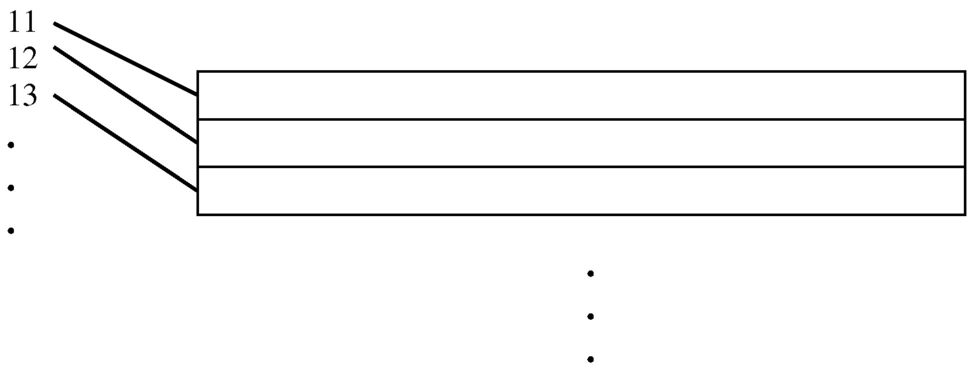
FIG. 3A is a stack of the laminates of FIG. 2.
Figure 3B:
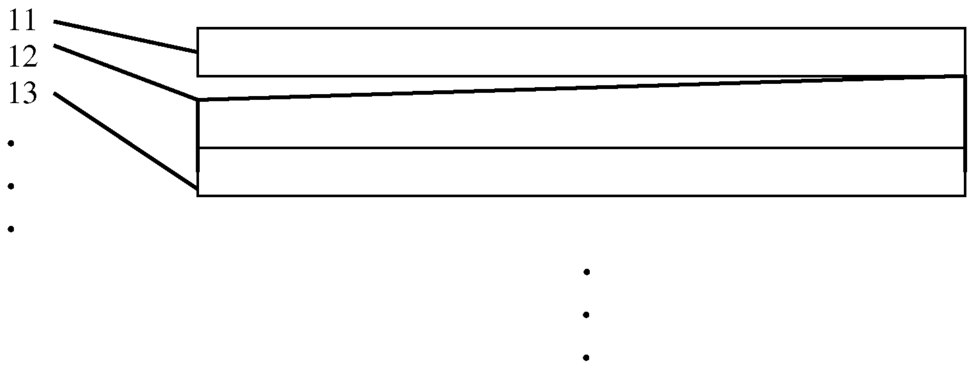
FIG. 3B is a stack of the laminates of FIG. 2 in which a lack of coplanarity is exhibited.

With reference to FIGS. 3A and 3B, once the measurements are taken and the shapes of each of the laminates 11, 12, 13, . . . are characterized, the laminates 11, 12, 13, . . . are assembled. Typically, a laminate assembly process includes layering the laminates 11, 12, 13, . . . on top of one another and bonding them together in accordance with known methods. In this way, if the laminates 11, 12, 13, . . . do not exhibit warpage beyond a predefined threshold and/or present coplanarity, the laminate assembly should indicate that the laminates fit together successfully, as shown in FIG. 3A. However, if laminate 12 exhibits a lack of coplanarity with the other laminates, as shown in FIG. 3B, the laminate assembly process should indicate that the laminates fit fail to fit together successfully whereby laminate 12 should be discarded or, if possible, corrected prior to reassembly.

With this in mind, it is possible to derive a first relationship between the first shapes of the laminates 11, 12, 13, . . . and yield loss where the yield loss is predefined in accordance with, for example, a cost/benefit analysis or a similar type of analysis, such as operational or functional analyses.

Figure 4A:
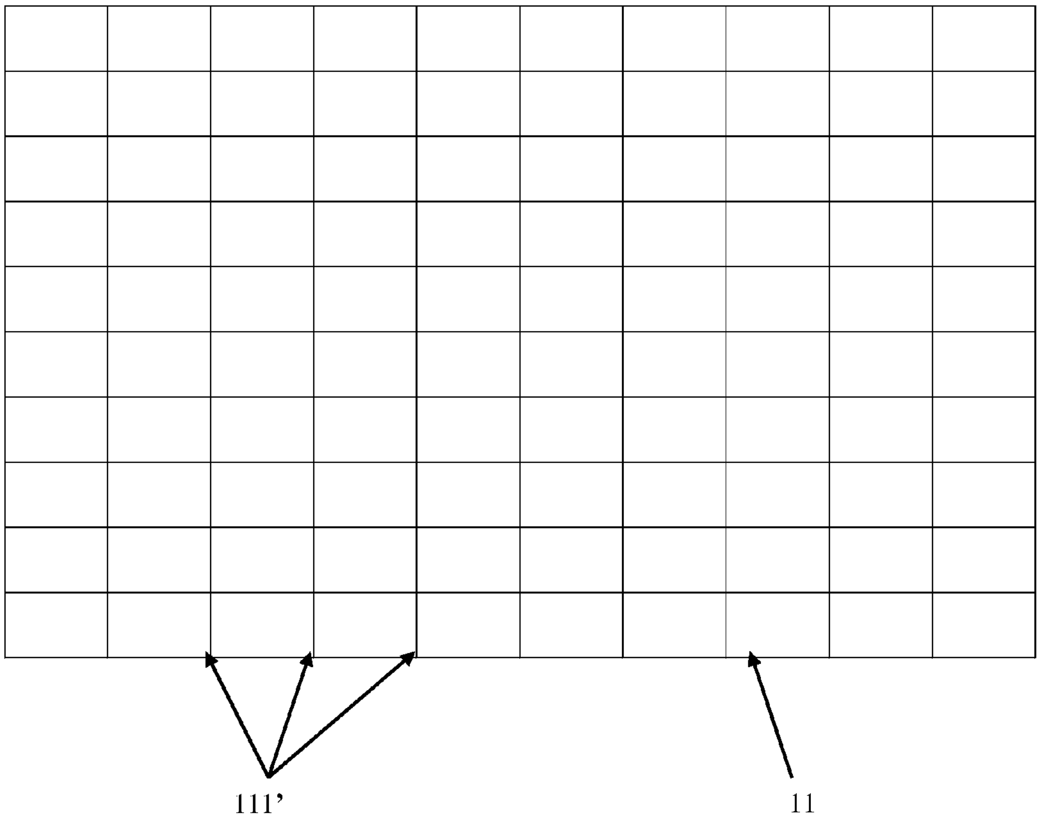
FIG. 4A is a 10×10 grid defined on the laminate surface of the laminate of FIG. 2.
Figure 4B:
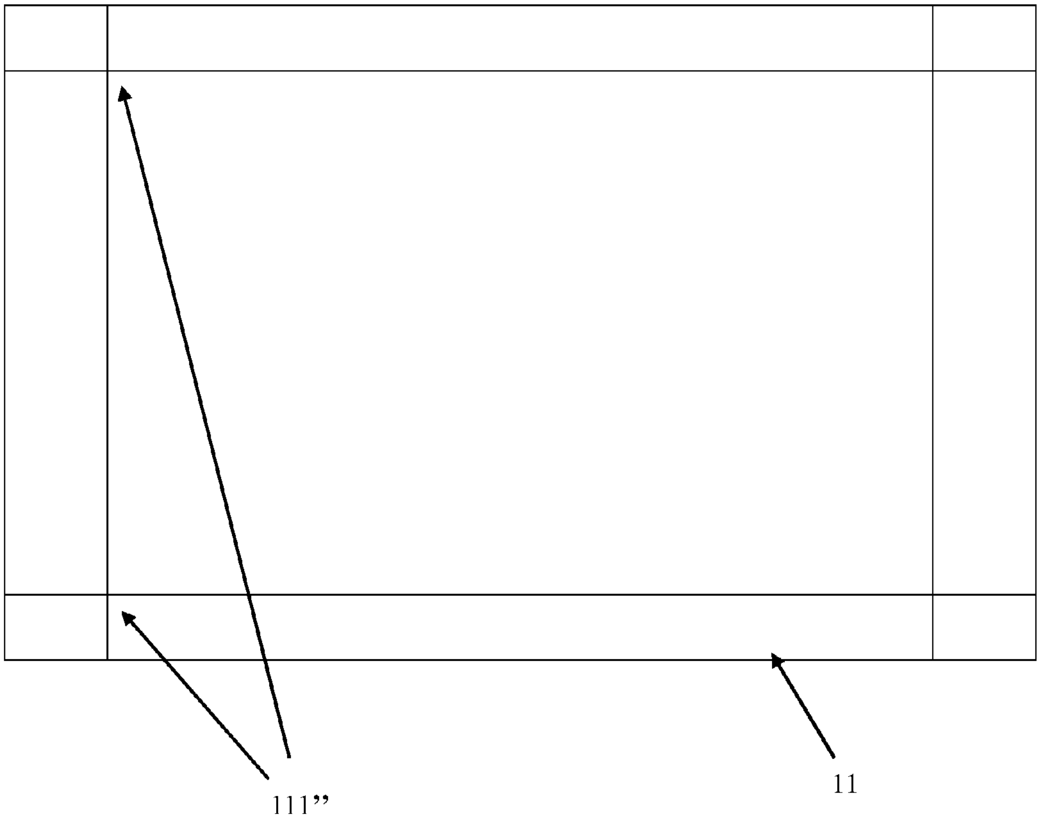
FIG. 4B is a grid with measurement points defined at corners on the laminate surface of the laminate of FIG. 2.

With reference to FIGS. 4A and 4B, the characterization of the second shapes of the laminate 11 from a reduced number of the measurements allows for derivation of a second relationship between the second shapes and the yield loss. In accordance with embodiments, the number of the measurements can be reduced by averaging local measurements or, shown in FIG. 4A, assigning a single measurement at a single grid point 111' as being representative of multiple local measurements or, as shown in FIG. 4B, by taking measurements only from grid points 111" located at predefined areas of the laminate 11, such as the edges of the laminate 11, the center of the laminate or, in other cases, the edges and the center of the laminate. In still further embodiments, the grid points 111" may be located at areas of the laminate 11 known to be highly correlated to overall shape.

Once the second relationship is derived, the first and second relationships can be compared with one another such that any change in the derived relationships can be analyzed to determine a least number of the measurements necessary for achieving the yield loss. This analysis may include one or more logical regression techniques and/or a determination of whether a difference between the first and second relationships is within a predefined threshold. That is, if the first and second relationships are substantially similar to one another, it can be determined that a further reduction of the number of measurements is possible without sacrificing model accuracy. By contrast, if the relationships are substantially different, the difference is an indication that larger numbers of measurements are needed to achieve a desired model accuracy.

With the least number of measurements required established, a supply of to this point unmeasured laminates may be sorted in accordance with a characterized shape of each, where the characterized shape is obtained from the least number of the measurements taken for each supplied laminate and the sorting includes sorting usable from unusable ones of the supplied laminates. Additionally, in accordance with further embodiments, an accuracy of the sorting operation may be evaluated by comparing the characterized shape of each of the supplied laminates with a predefined shape. Still further, the analyzing of the change in the derived relationships may then be modified based on a result of the evaluation.

Figure 5:
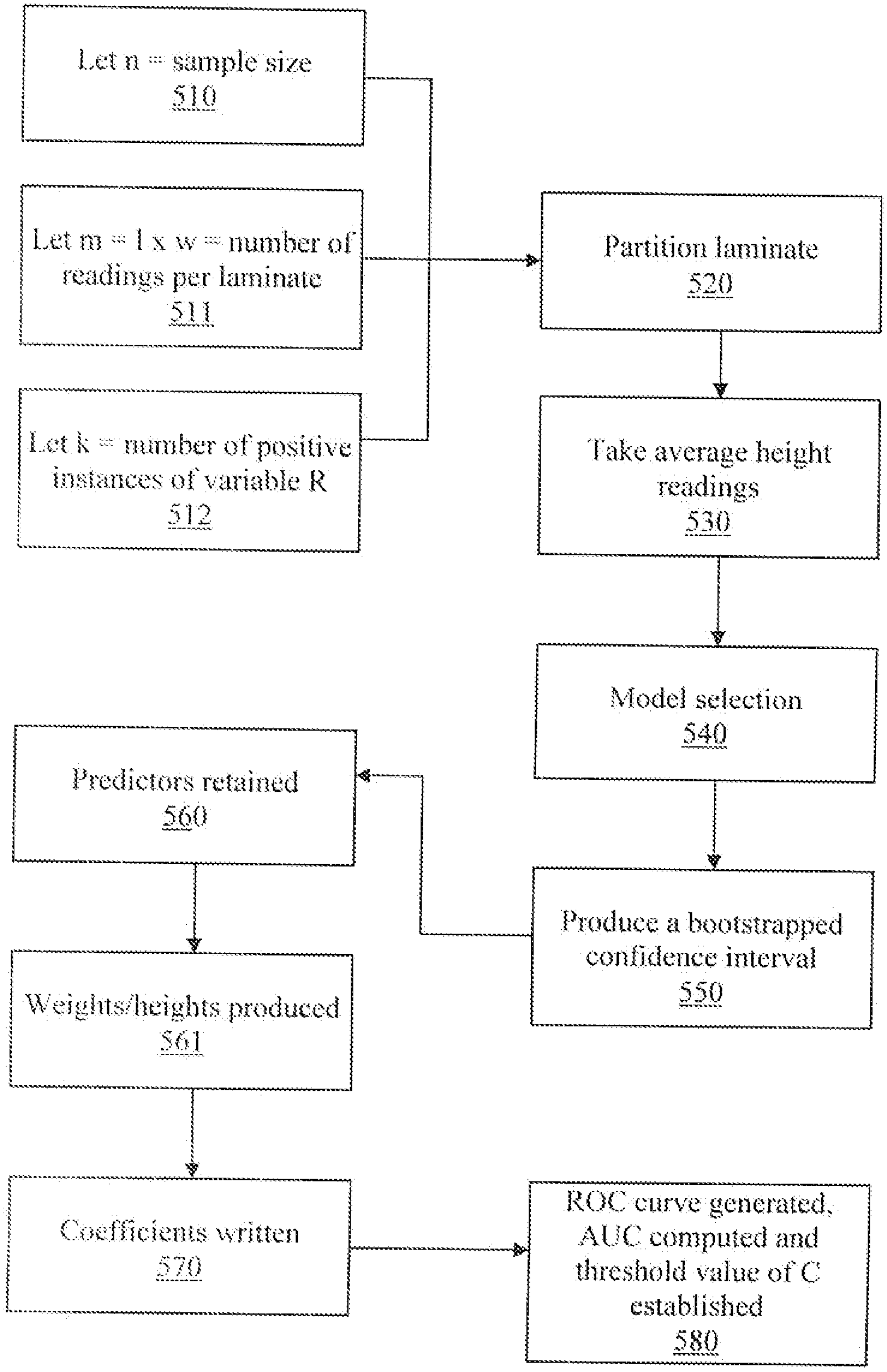
FIG. 5 is a flow diagram illustrating a method of characterizing a laminate shape in accordance with embodiments of the invention.

As shown in FIG. 5 and, in accordance with various embodiments, an exemplary method includes the following operations performed on a sample of laminates that has a size sufficiently large enough to allow for capture of some shape features, including concavity and/or convexity, which are detrimental to yield optimization. The method includes letting n=a sample size (510) and letting m=1×w=a number of readings per laminate (i.e., "heights")(511), where 1 is the number of columns and w is the number of rows. The ratio r=1/w will be useful as described below. The method further includes letting k=a number of positive instances of response variable R, where R=1 if a condition is seen and R=0 otherwise (512).

At this point, given a sample size, n, and a number, k, of positive response variable, R, the following data pre-processing operations are undertaken. Each laminate is partitioned in an l×w grid (520), where l and w are chosen such that l×w<k. For example, l may be chosen as being an integer part of $\sqrt{k/r}$ and the choice for w becomes obvious. A constraint to this operation is to avoid degeneracy in the model that will select relevant features. Next, height readings are averaged locally (530) (i.e., the l×w grid is divided into subsets) to obtain a lower count (l×w) of possible values. These values are the predictors to be used in the model.

Once operations 520 and 530 are completed, model selection begins (540) and is based on repeated trials of logistic regression on the bootstrapped data set. Then, based on a predefined percentage, say 95%, a 95% bootstrapped confidence interval (CI) is produced (550). From this CI, significant predictors are retained or selected (560) from which the weights, A1 . . . AN, and the heights, X1 . . . XN, are produced (561). Once the predictors are selected, linear combinations of predictors with the weight, A1 . . . AN, and the height, X1 . . . XN, coefficients may be written (570) such that an explanatory variable (i.e., the "logit") can be derived. From the explanatory variable, a receiver operating characteristic (ROC) curve can be generated, AUC can be computed and a threshold (specification) value of C can be established in accordance with risk/reward and/or cost/yield improvement analysis (580).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A method of sorting laminates, comprising:

characterizing first shapes of laminates to determine a warpage calculation from measurements taken of each, wherein the measurements comprise at least one of:
- a laminate height;
- a degree of concavity;
- a degree of convexity; and
- a laminate thickness;

assembling the laminates, wherein the assembling comprises layering the laminates one laminate on top of another laminate to derive a first relationship between the assembled laminates, based on the assembled laminates exhibiting warpage exceeding a predefined threshold;

characterizing second shapes of the laminates from a reduced number of the measurements to derive a second relationship between the second shapes and yield loss;

iteratively analyzing a change in the derived relationships, using a logical regression technique, to determine a least number of the measurements necessary for achieving the yield loss;

sorting supplied laminates in accordance with a characterized shape of each, which is obtained from the least number of the measurements taken for each supplied laminate, wherein the sorting comprises the sorting of usable laminates from unusable laminates; and evaluating an accuracy of the sorting, and modifying the analyzing of the change in the derived relationships based on a result of the evaluation.

2. The method according to claim 1, further comprising taking the measurements along a traceable pattern.

3. The method according to claim 1, wherein the measurements comprise laminate height measurements taken at grid points mapped onto the laminates.

4. The method according to claim 1, wherein the measurements comprise laminate thickness measurements taken at grid points mapped onto the laminates.

5. The method according to claim 1, wherein the assembling comprising layering and bonding the laminates.

6. The method according to claim 1, further comprising reducing the number of measurements by averaging local measurements.

7. The method according to claim 1, further comprising reducing the number of measurements by assigning a single measurement as being representative of multiple local measurements.

8. The method according to claim 1, further comprising reducing the number of measurements by taking measurements only from predefined areas of the laminates.

9. The method according to claim 1, wherein the analyzing of the change in the derived relationship comprises determining whether a difference between the first and second relationships is within a predefined threshold.

10. The method according to claim 1, further comprising defining the yield loss in accordance with a cost/benefit analysis.

11. The method according to claim 1, wherein the evaluating comprises comparing the characterized shape of each of the supplied laminates with a predefined shape.

12. A system to sort laminates, comprising:

an inspection apparatus to inspect laminates and to generate data in accordance with results of the inspection;

a networking unit coupled to the inspection apparatus; and a computing device, coupled to the networking unit, to receive the data generated by the inspection apparatus by way of the networking unit, the computing device including a processing unit and a non-transitory computer readable medium on which executable instructions are stored, which, when executed, cause the processing unit to:

characterize first shapes of the laminates to determine a warpage calculation from measurements taken of each, wherein the measurements comprise at least one of:
- a laminate height;
- a degree of concavity;
- a degree of convexity; and
- a laminate thickness;

assemble the laminates, wherein the assembled laminates comprise layering the laminates one laminated on top of another laminate to derive a first relationship between the assembled laminates, based on the assembled laminates exhibiting warpage exceeding a predefined threshold;

characterize second shapes of the laminates from a reduced number of the measurements to derive a second relationship between the second shapes and yield loss, iteratively analyze a change in the derived relationships, using a logical regression technique, to determine a least number of the measurements necessary for achieving the yield loss, sort supplied laminates in accordance with a characterized shape of each, which is obtained from the least number of the measurements taken for each supplied laminate; wherein the sorting comprises the sorting of usable laminates from unusable laminates; and evaluated an accuracy of the sort, and modify the analyzed changed in the derived relationships based on a result of the evaluation.

13. The system according to claim 12, wherein the inspection apparatus is configured to measure laminate thicknesses along a traceable pattern.

14. The system according to claim 12, wherein the inspection apparatus is configured to measure laminate heights along a traceable pattern.

* * * * *